(12) United States Patent
Choi

(10) Patent No.: US 7,748,680 B2
(45) Date of Patent: Jul. 6, 2010

(54) FOLDABLE STAND FOR DISPLAY DEVICE

(75) Inventor: Chi Young Choi, Goomi-si (KR)

(73) Assignee: LG Electronics Inc., Seoul (KR)

( * ) Notice: Subject to any disclaimer, the term of this patent is extended or adjusted under 35 U.S.C. 154(b) by 738 days.

(21) Appl. No.: 11/498,765

(22) Filed: Aug. 4, 2006

(65) Prior Publication Data

US 2007/0152114 A1 Jul. 5, 2007

(30) Foreign Application Priority Data

Dec. 30, 2005 (KR) ...................... 10-2005-0136027

(51) Int. Cl.
*A47G 29/00* (2006.01)
(52) U.S. Cl. .................... 248/371; 248/676; 248/176.3; 248/917; 248/918; 248/919; 248/920; 248/921; 248/922; 248/923; 248/289.11; 248/291.1; 248/349.1; 361/679.06; 361/679.21; 361/679.22; 16/367
(58) Field of Classification Search ................ 248/676, 248/176.3, 917–923, 371, 289.11, 291.1, 248/349.1; 361/679.06, 679.21, 679.22; 16/367
See application file for complete search history.

(56) References Cited

U.S. PATENT DOCUMENTS

| | | | | |
|---|---|---|---|---|
| 3,908,942 | A * | 9/1975 | Keith et al. ................. | 248/158 |
| 4,905,543 | A * | 3/1990 | Choi ........................... | 74/827 |
| 4,974,808 | A * | 12/1990 | Ball ........................... | 248/639 |
| 4,989,813 | A * | 2/1991 | Kim et al. ................. | 248/184.1 |
| 5,416,730 | A * | 5/1995 | Lookofsky .................. | 361/680 |
| 5,870,280 | A * | 2/1999 | Cho ........................... | 361/681 |
| 5,895,022 | A * | 4/1999 | Kim ........................... | 248/398 |
| 6,095,467 | A * | 8/2000 | Neuhof ..................... | 248/278.1 |
| 6,105,919 | A * | 8/2000 | Min ........................... | 248/418 |
| 6,484,994 | B2 * | 11/2002 | Hokugoh .................... | 248/371 |
| 6,510,049 | B2 * | 1/2003 | Rosen ........................ | 361/681 |
| 6,595,481 | B1 * | 7/2003 | Huang et al. ............. | 248/349.1 |
| 6,601,810 | B2 * | 8/2003 | Lee ........................... | 248/278.1 |
| 6,659,416 | B2 * | 12/2003 | Hicks et al. ............ | 248/346.11 |
| 6,789,976 | B2 * | 9/2004 | Hung et al. .................. | 403/84 |
| 6,822,857 | B2 * | 11/2004 | Jung et al. .................. | 361/681 |
| 6,837,469 | B2 * | 1/2005 | Wu et al. ................. | 248/278.1 |
| 6,921,057 | B2 * | 7/2005 | Chen et al. ............... | 248/349.1 |
| 6,954,221 | B2 * | 10/2005 | Wu ............................ | 361/681 |
| 7,072,175 | B2 * | 7/2006 | Ho ............................. | 361/681 |

(Continued)

FOREIGN PATENT DOCUMENTS

JP 2000-056695 2/2000

OTHER PUBLICATIONS

Chinese Office Action dated Nov. 9, 2009.

*Primary Examiner*—Anita M King
*Assistant Examiner*—Nkeisha J Smith
(74) *Attorney, Agent, or Firm*—KED & Associates, LLP

(57) ABSTRACT

A stand for a display is provided. The stand can reduce a delivery volume of the display and can provide for adjustment of a rotation angle thereof during use. The stand may include a support connected to a lower portion of the display, a pivot block pivotably coupled to the support, a rear base connected to the pivot block, a swivel that pivotably couples the pivot block and the rear base, and a front base coupled to the rear base.

15 Claims, 12 Drawing Sheets

U.S. PATENT DOCUMENTS

| | | | |
|---|---|---|---|
| 7,148,874 B2* | 12/2006 | Anzai et al. | 345/156 |
| 7,226,028 B2* | 6/2007 | Lin | 248/291.1 |
| 7,273,202 B2* | 9/2007 | Tien et al. | 248/417 |
| 7,287,729 B2* | 10/2007 | Jung et al. | 248/122.1 |
| 7,303,174 B2* | 12/2007 | Li | 248/346.06 |
| 7,353,569 B2* | 4/2008 | Chen et al. | 16/340 |
| 7,370,838 B2* | 5/2008 | Jeong et al. | 248/125.7 |
| 7,384,021 B2* | 6/2008 | Liao | 248/415 |
| 2001/0055196 A1 | 12/2001 | Anzai et al. | 361/681 |
| 2002/0140875 A1 | 10/2002 | Ho | 348/839 |
| 2003/0132360 A1* | 7/2003 | Ju | 248/371 |
| 2005/0045782 A1* | 3/2005 | Lee et al. | 248/158 |
| 2005/0051692 A1 | 3/2005 | Jung et al. | 248/371 |
| 2006/0016942 A1* | 1/2006 | Lo | 248/131 |
| 2006/0049327 A1* | 3/2006 | Chen | 248/371 |
| 2006/0077629 A1* | 4/2006 | Shiraishi | 361/681 |
| 2006/0146487 A1* | 7/2006 | Huang | 361/681 |
| 2006/0284034 A1* | 12/2006 | Takaji et al. | 248/131 |
| 2007/0023600 A1* | 2/2007 | Lee | 248/288.11 |
| 2007/0090233 A1* | 4/2007 | Choi | 248/122.1 |
| 2007/0109734 A1* | 5/2007 | Chen et al. | 361/681 |
| 2007/0215762 A1* | 9/2007 | Lee et al. | 248/125.7 |
| 2008/0035821 A1* | 2/2008 | Kameoka et al. | 248/349.1 |
| 2008/0093528 A1* | 4/2008 | Tsai et al. | 248/917 |
| 2008/0100567 A1* | 5/2008 | Tsai | 345/156 |
| 2008/0100997 A1* | 5/2008 | Chen | 361/681 |

* cited by examiner

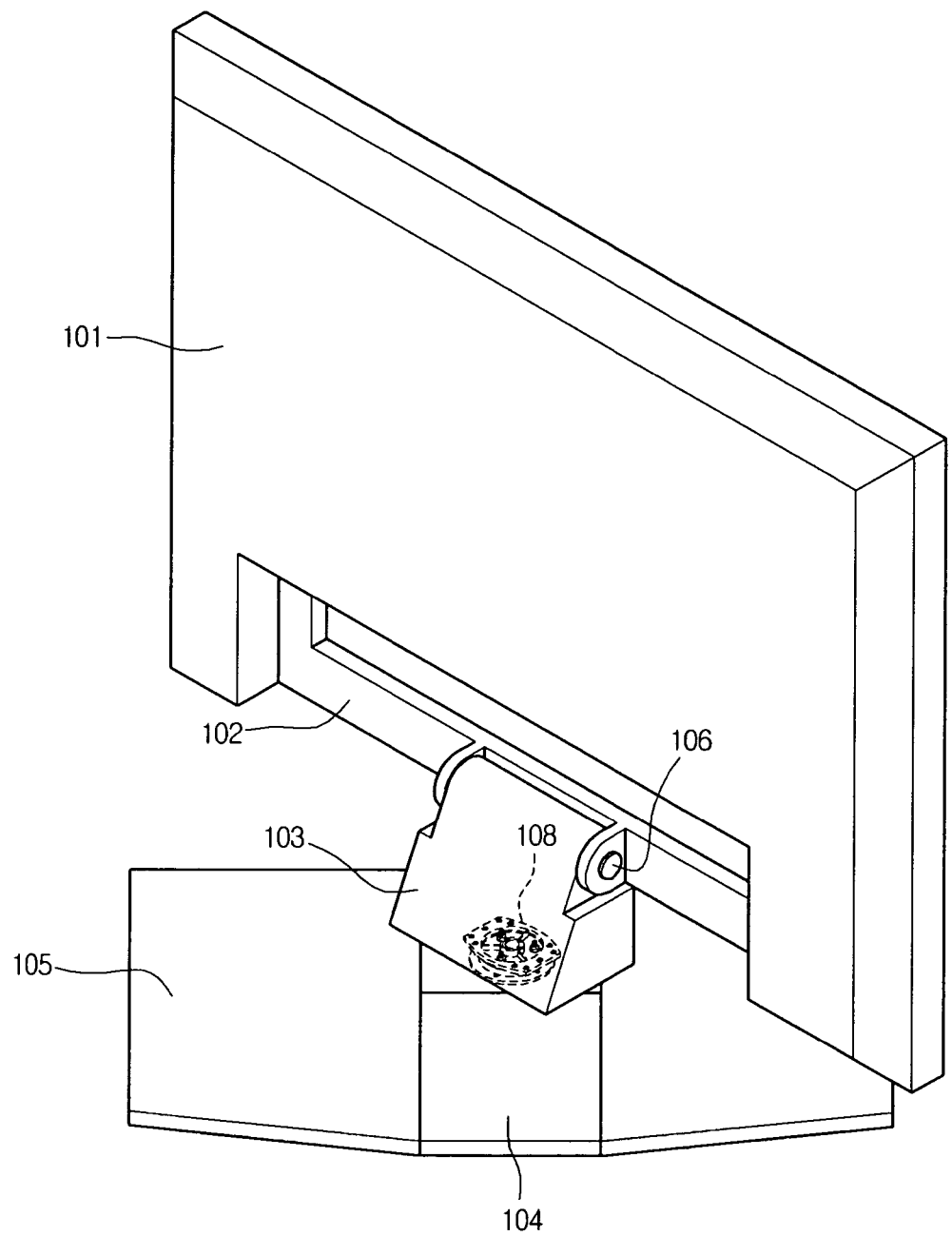

FOLDABLE STAND FOR DISPLAY DEVICE

BACKGROUND OF THE INVENTION

1. Field of the Invention

The present invention relates to a stand for a display device, and more particularly, to a stand for a display device, capable of increasing the quantity loaded in the same volume by reducing a volume when a display device is packaged, reducing the package cost and logistics cost, and stably supporting the display device.

2. Description of the Related Art

Generally, a stand is installed under a display device, such as PDP and LCD, to support the display device.

The stand includes a support fixed under the display device and a base connected to the support and placed on the floor. It is usual that the base connected to the support is fixedly installed to the support, or fixed thereto in a swivel type. To prevent the display device from falling down front or rear, the base is formed such that its area contacting the floor is increased.

To increase the contact area between the stand and the floor, the base is formed to protrude toward the front or rear of a front side and a back cover forming a main body of the display device. The base of the stand is increasing as the size of the display device is increasing. As the size of the display device is increasing, the "falling-down" power of the display device is also increasing. Therefore, the area supporting the center of gravity must be increased.

However, if the front or rear extending length of the base fixed under the display device is increased, the package of the display device and the package volume are increased due to the protrusion of the base during the delivery. Consequently, the package cost and the logistics cost are increased and the treatment becomes inconvenient.

Also, the stand has a portion extending toward the rear of the display device. Therefore, in the case of a flat display device, when the back cover of the main body is installed adjacent to the wall surface, the back cover must be spaced apart from the wall surface by a predetermined distance.

SUMMARY OF THE INVENTION

Accordingly, the present invention is directed to a stand for a display device that substantially obviates one or more problems due to limitations and disadvantages of the related art.

An object of the present invention is to provide a stand for a display device, capable of reducing a package volume of the display device.

Another object of the present invention is to provide a stand for a display device, capable of reducing the package coast and logistics cost. Due to the reduction in the package volume of the display device, the delivery and treatment become convenient.

A further object of the present invention is to provide a stand for a display device, capable of providing the swivel motion and reducing the volume of the display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand for a display device, including: a display device; a support connected to a lower portion of the display device; a pivot block connected to be operable with respect to the support; a rear base connected to the pivot block; a swivel disposed in a contact portion between the pivot block and the rear base such that the pivot block is pivotally rotated; and a front base connected to be operable with respect to the rear base.

In another aspect of the present invention, there is provided a stand for a display device, including: a support for supporting the display device; a pivot block connected to be movable with respect to the support; a swivel having at least a fixing portion and a pivot portion providing a pivot motion with respect to the fixing portion, the pivot portion being connected to the pivot block; a first base connected to the fixing portion and supported to a floor; and a second base connected to be movable with respect to the first base and supported by the floor.

In a further aspect of the present invention, there is provided a stand for a display device, including: a base; a swivel to which a first portion of the base is fixedly connected; a pivot block to which a second portion of the based is fixedly connected; and a support connected to the display device in a state in which the support is connected to the pivot block, whereby the base is rotated with respect to the display device while the display device is delivered, resulting in volume reduction.

Accordingly, the package size of the display device is reduced and is easy to treat, thereby reducing the cost in package, delivery, and logistics.

Also, the swivel motion of the display device can be freed and the volume of the display device can be reduced. Further, the outer appearance of the display device becomes elegant.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 12 and 13 illustrate a pivot motion of the display device due to the pivot block.

DETAILED DESCRIPTION OF THE INVENTION

Reference will now be made in detail to the preferred embodiments of the present invention, examples of which are illustrated in the accompanying drawings.

Figure 1:
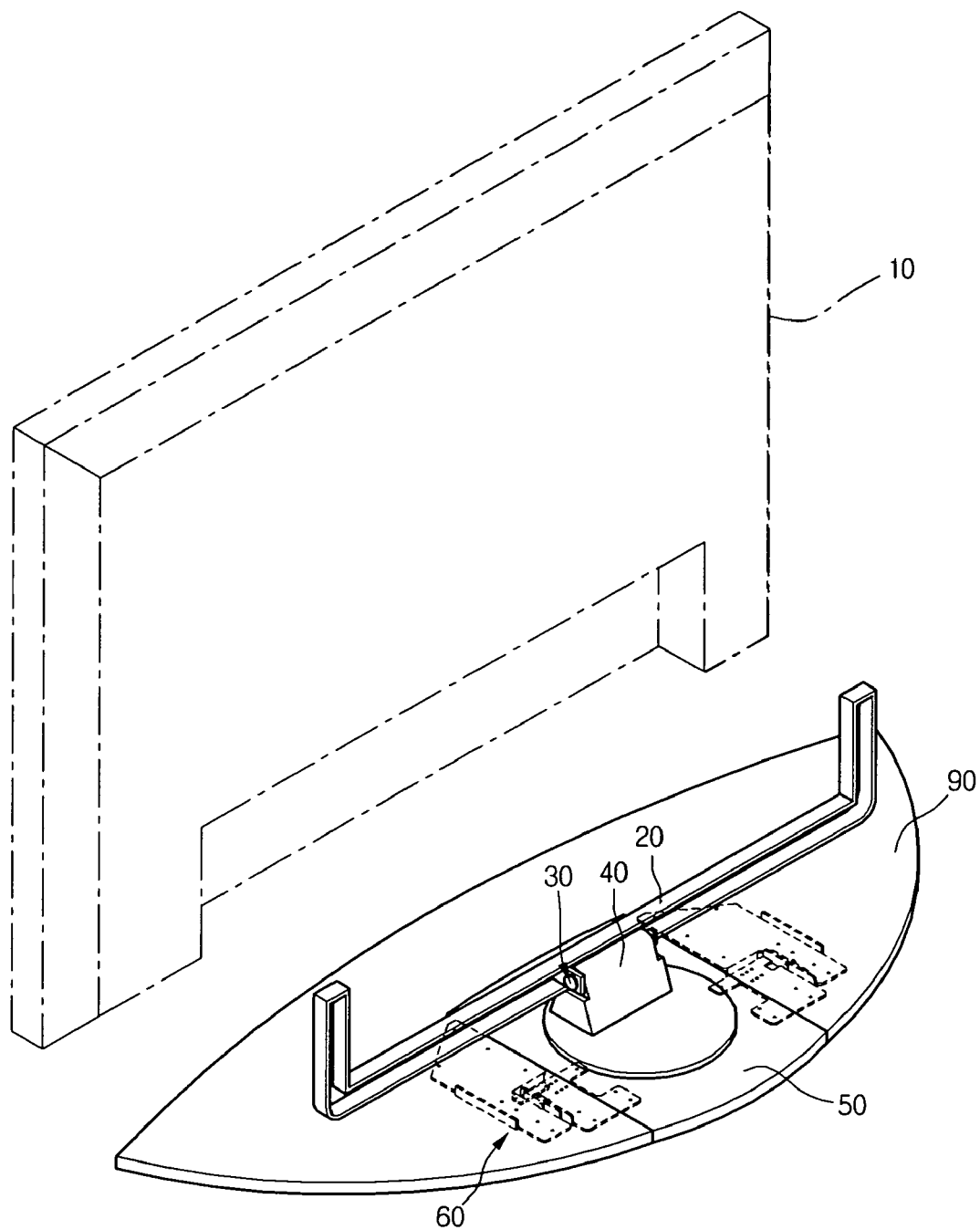
FIG. 1 is a perspective view of a display device and a stand.

FIG. 1 is a perspective view of a display device and a stand according to the present invention.

Referring to FIG. 1, a support 20 is extended downward in a state that its portion is connected to a rear surface of a flat display device 10. A pivot block 40 is connected to the support by a first hinge 30 at a rear of the support 20. A rear base 50 provides a support point of the pivot rotation of the pivot block 40 by a swivel (70 in FIG. 2) downward the pivot block 40, and prevents the flat display device 10 from falling backward. A front base 90 is connected to the rear base 50 by a second hinge 60 and prevents the flat display device 10 from falling forward.

A structure and operation of the parts will be described briefly with reference to the FIG. 1.

The support 20 is firmly connected to the rear surface of the flat display device 10, for example, by a screw connection. The rear surface of the flat display device 10, to which the support 20 is connected, is depressed by a predetermined depth, thereby minimizing the interference of the stand's rear portion against the wall surface and making its appearance elegant.

The support 20 and the pivot block 40 are connected together by the first hinge 30. The pivot block 40 can be completely folded at more than 90° toward the rear surface of the flat display device 10. The rear surface of the support 20 contacts the front surface of the pivot block 40, thereby preventing the support 20 from falling forward. To prevent the support 20 from falling backward, a fixing pin (34 in FIG. 2) is simultaneously inserted into the support 20 and the pivot block 40 at an adjacent side portion where the first hinge 30 is installed. The fixing pin 34 is installed after the display device 10 is placed on the floor. However, when there is no fixing pin 34, it is possible to prevent the display device 10 from falling backward because the center of gravity of the display device 10 is placed forward. Further, in addition to the fixing pin 34, any member that can prevent the display device 10 from falling backward can be used.

A swivel (70 in FIG. 2) is provided at an interval between the pivot block 40 and the rear base 50, and the swivel 70 itself can be pivotally rotated. Therefore, when the display device 10 is pivotally rotated due to an external force, the support 20, the pivot block 40, and the upper portion of the swivel 70 can be pivotally rotated smoothly, so that the view angle of the display device 10 can be adjusted. The swivel 70 is fixed to the lower portion of the pivot block 40. To firmly maintain the shape while fixing the swivel 70, the pivot block 40 may be formed of metal using die casting.

The rear base 50 is fixed to the lower portion of the swivel 70. Therefore, when the user rotates the display device 10, the lower portion of the swivel 70 and the rear base 50 can be operated as a support surface of the pivot rotation.

The second hinge 60 is provided on both sides of the rear base 50, and the front base 90 can be rotated with respect to the rear base 50 around the second hinge 60. Thus, when packaging the product, the rear base 50 can be folded rearward such that it is closed contacted with the rear side of the display device 10.

Figure 2:
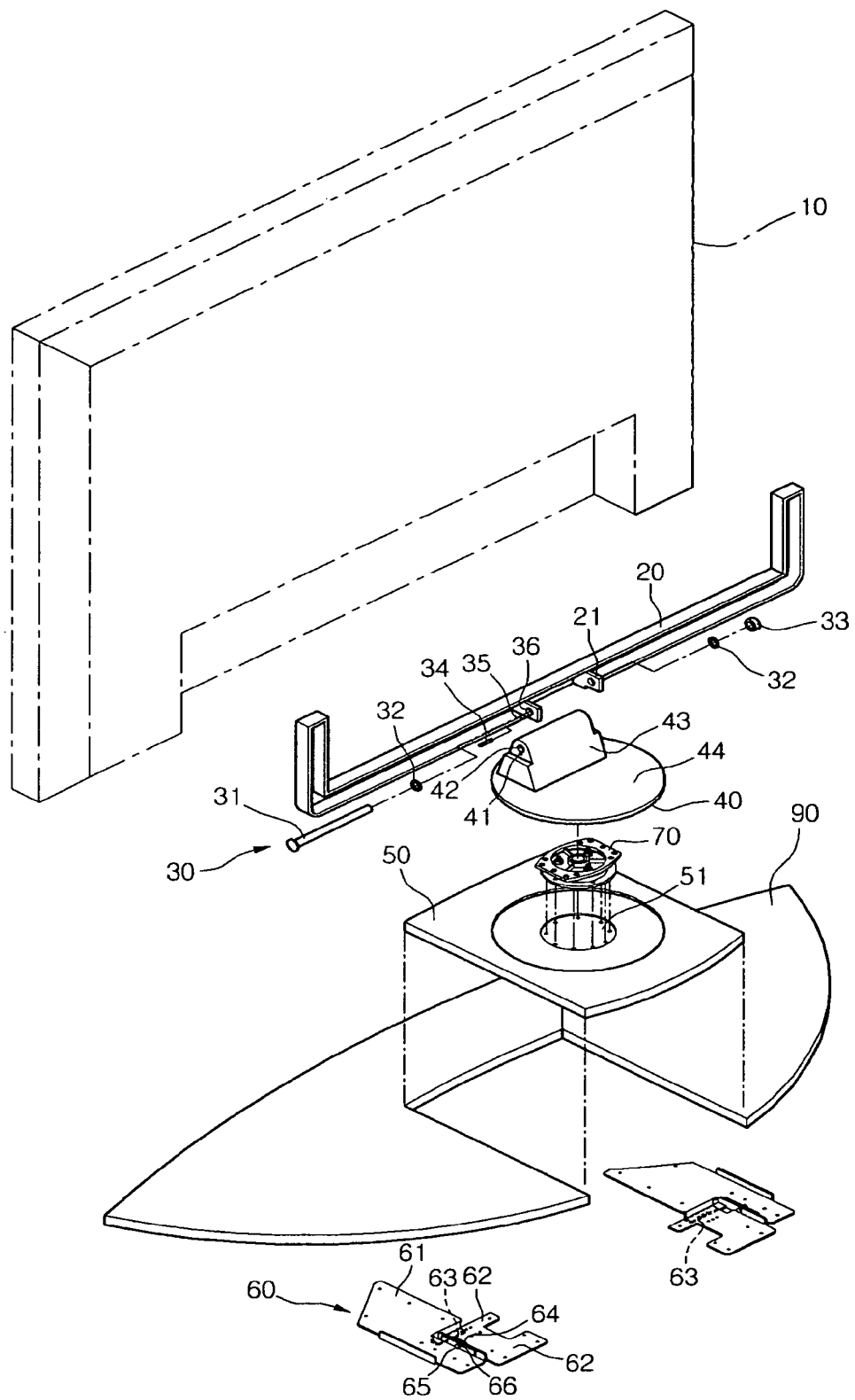
FIG. 2 is an exploded perspective view of a stand for a display device according to the present invention.

FIG. 2 is an exploded perspective view of the stand for the display device according to the present invention. A structure of the stand according to the present invention will be described in detail with reference to FIG. 2.

First, the support 20 is firmly fixed to the rear surface of the display device 10. A pair of protrusions 21 is protruded rearward in a surface shape about the center of the support. The protrusions 21 are provided in a state that they are aligned with a protrusion block 43 disposed at the upper portion of the pivot block 40, and the first hinge 30 is provided at its contact portion. The first hinge 30 includes hinge insertion holes 36 and 42 aligned to the protrusion 21 and the protrusion block 43, a first hinge shaft 31 inserted into the hinge insertion holes 36 and 42, and a nut 33 fixed to an end of the first hinge shaft 31. Also, the first hinge 31 further includes a washer 32 for providing an appropriate fiction force when the first hinge 30 is rotating. Meanwhile, the first hinge 31 is placed in a horizontal extending direction of the display device 10 such that the pivot block 40 can be folded rearward the display device 10. This can be equally applied to a bolt 64 operating as a rotation shaft of the second hinge 60.

It is preferable that the friction force occurring when the first hinge 30 is rotating is greater than that occurring when the second hinge 60 is rotating. When installing the display device 10 after unpacking, the first hinge 30 is made to rotate later. Therefore, it is possible to prevent the user from being hurt because the user thinks the bases 50 and 90 are one body.

Also, fixing pin insertion holes 35 and 41 aligned together are further formed at the protrusion 21 and the protrusion block 43. The fixing pin 34 is inserted into the fixing pin insertion hole, thereby preventing the display device 10 from falling rearward.

The pivot block 40 includes a circular planar portion 44 so as to prevent the interference against the rear base 50 during the rotation. An upper portion of the swivel 70 is fixed to the lower portion of the planar portion 44. It is preferable that the pivot block 40 is formed of metal so as to prevent the problems of damage and deformation when the swivel 70 is fixed.

Figure 3:
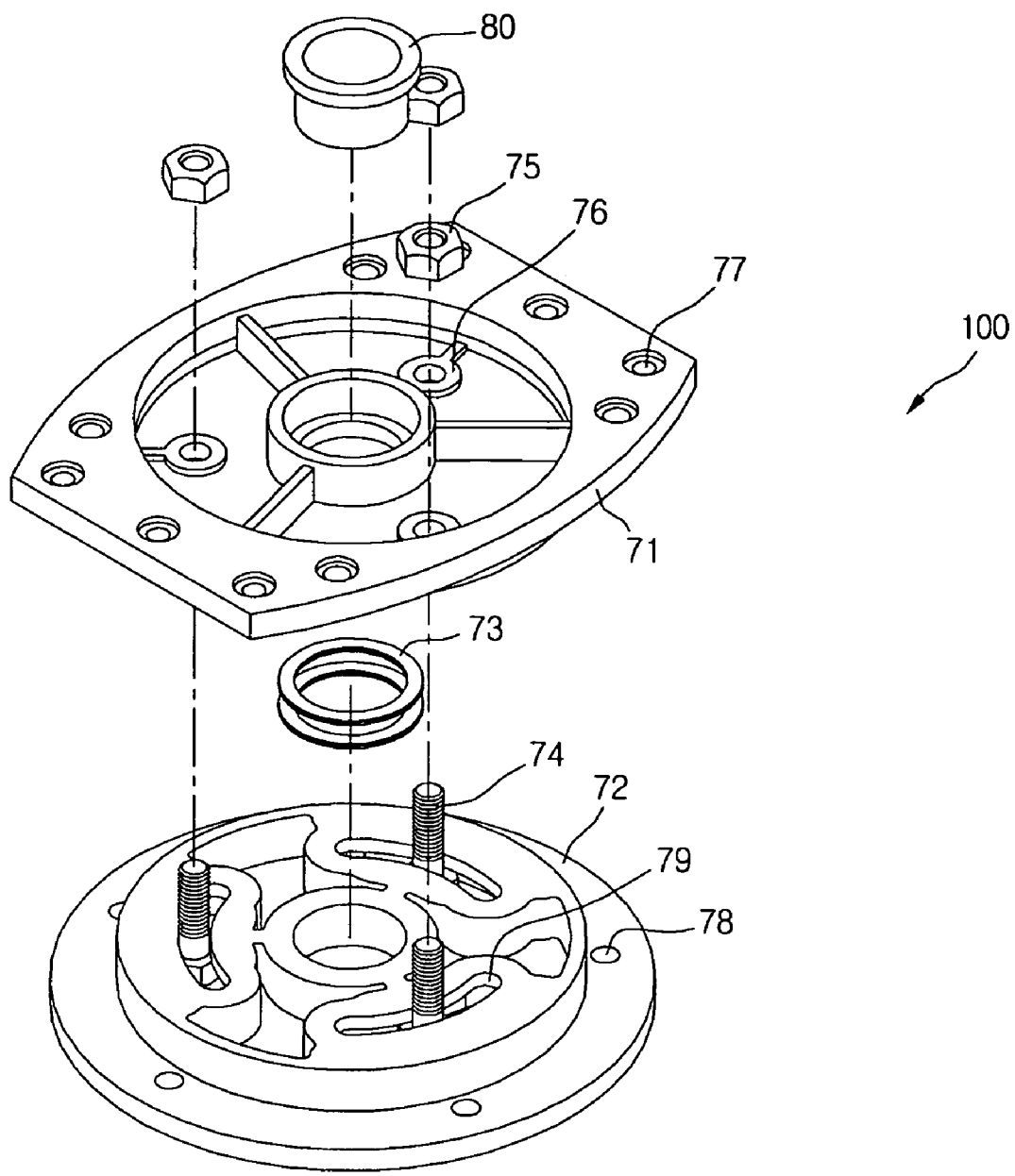
FIG. 3 is an exploded perspective view of a swivel.

The swivel 70 is a device that can provide the pivot motion with respect to the center shaft vertically erected. FIG. 3 is an exploded perspective view of the swivel 70. Referring to FIG. 3, the swivel 70 includes an upper rotation plate 71 at an upper portion, a fixing plate 72 at a lower portion, and a bolt 74 for connecting the upper rotation plate 71 and the fixing plate 72. The fixing plate 72 can be pivotally rotated by the bolt 74 within a range in which the interference does not occur.

The bolt 74 is fixed by the nut 75 in a state that the it is inserted into a bolt connector 76 formed at the rotation plate 71. The bolt 74 is guided in a state that it is inserted into a guide hole 79 with respect to the fixing plate 72. The guide hole 79 is formed in an arc shape. When the rotation plate 71 is rotated, the guide hole 79 sets a rotation limit of the bolt 74.

Also, a clutch 73 is inserted into a gap between the fixing plate 72 and the upper rotation plate 72. The clutch 73 is supported by a bushing 80. When the upper rotation plate 71 is rotated, the clutch 73 prevents the friction force occurring at the contact portion with the fixing plate 72, thereby providing the smooth rotation of the rotation plate 71.

Further, an upper fixing hole 77 is provided at the upper rotation plate 71. The bolt 74 is inserted into the fixing hole formed at the position corresponding to the pivot block 40, whereby the upper rotation plate 71 and the pivot block 72 are firmly fixed. The lower fixing hole 78 is formed at the fixing plate 72. The bolt 74 is inserted into the fixing hole formed at the position corresponding to the swivel seating portion 51, whereby the fixing plate 72 and the rear base 50 are firmly fixed together.

As described above, when the fixing plate 72 is fixed to the rear base 50, the rotation plate 71 disposed at the upper portion of the swivel 70 can be pivotally rotated with respect to the fixing plate 72. Consequently, the pivot block 40 can be pivotally rotated smoothly with respect to the rear base 50.

Referring again to FIG. 2, the swivel seating portion 51 is formed at the rear base 50 to fix the swivel 70. The swivel seating portion 51 is formed of metal, which is different from plastic material of the rear base 50. When the swivel 70 is fixed to the rear base 50, the swivel seating portion 51 prevents the connector of the rear base 50 from being damaged. It will be apparent that the rear base 50 prevents the display device 10 from falling rearward.

The front base 90 is provided at the front of the rear base 50. The front base 90 prevents the display device 10 from falling forward and is connected to the rear base 50 by the second hinge 60. Two second hinges 60 are provided at the left and right of the rear base 50 and make the front base 90 rotate smoothly with respect to the rear base 50.

A structure of the second hinge 60 will now be described in detail. The second hinge 60 includes a plate 62 fixed to the rear base 50, and a plate 61 fixed to the front base 90. A connection portion of the plates 61 and 62 is fixed to a vertically bent plate by a bolt 64. A nut 65 is inserted into an opposite side of a head of the bolt 64. A washer 66 is inserted into the body of the bolt 64. A friction force due to the second hinge 60 can be adjusted by a fastening force of the bolt 64 and the nut 65 and a friction of the washer 66.

Meanwhile, the front base 90 is supported to the rear base 50 only by the second hinge 60, and the pivot block 40 is supported only by the rear base 50. Therefore, the falling-down force toward the front or rear of the display device 10 is applied only to the rear base 50. Even if the falling-down force toward the rear of the display device 10 is supported by the position and shape of the rear base 50 connected to the pivot block 40, the falling-down force toward the front of the display device 10 is supported not by the rear base 50 but by the front base 90. To prevent the display device from falling forward, a locking protrusion 63 is formed at the plate 61 of the second hinge 60, and an end portion of the plate 62 is placed on the locking protrusion 63.

Due to such a structure, the falling-down force directed toward the display device 10 is applied to the locking protrusion 63 at the upper portion of the plate 62 and thus can be supported by the plate 61 and the front base 90.

The structure of the stand for the display device can be understood fully, and the operation of the stand will be described below. The stand can be pivotally rotated right and left by the swivel 70. The respective parts of the stand are folded in the rearward direction of the display device 10 by the first and second hinges 30 and 60, thereby reducing the package volume.

Figure 4:
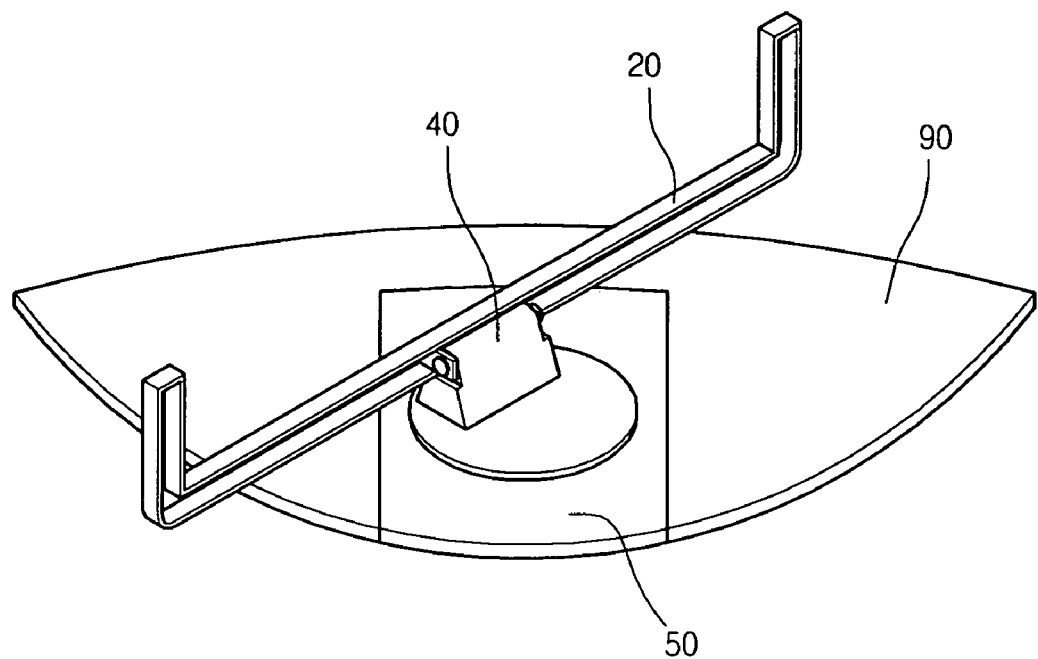
FIGS. 4 and 5 illustrate the left/right rotation of the display device.
Figure 5:
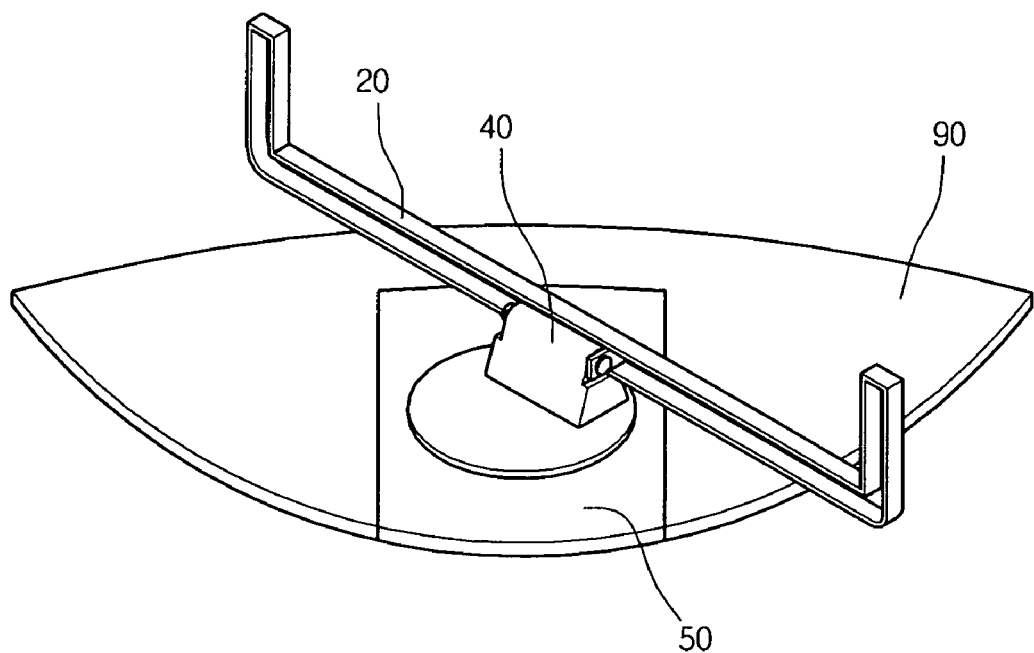

First, the pivot motion of the swivel 70 will be described. The upper portion of the upper rotation plate 71 of the swivel 70 can be pivotally rotated with respect to the fixing plate 72 of the swivel 70. Therefore, it can be pivotally rotated in a right direction at a predetermined angle, as illustrated in FIG. 4. Also, it can be pivotally rotated in a left direction at a predetermined angle, as illustrated in FIG. 5. As described above with reference to FIG. 3, the pivot angle of the display device 10 is limited within the range of the guide hole 79.

Figure 6:
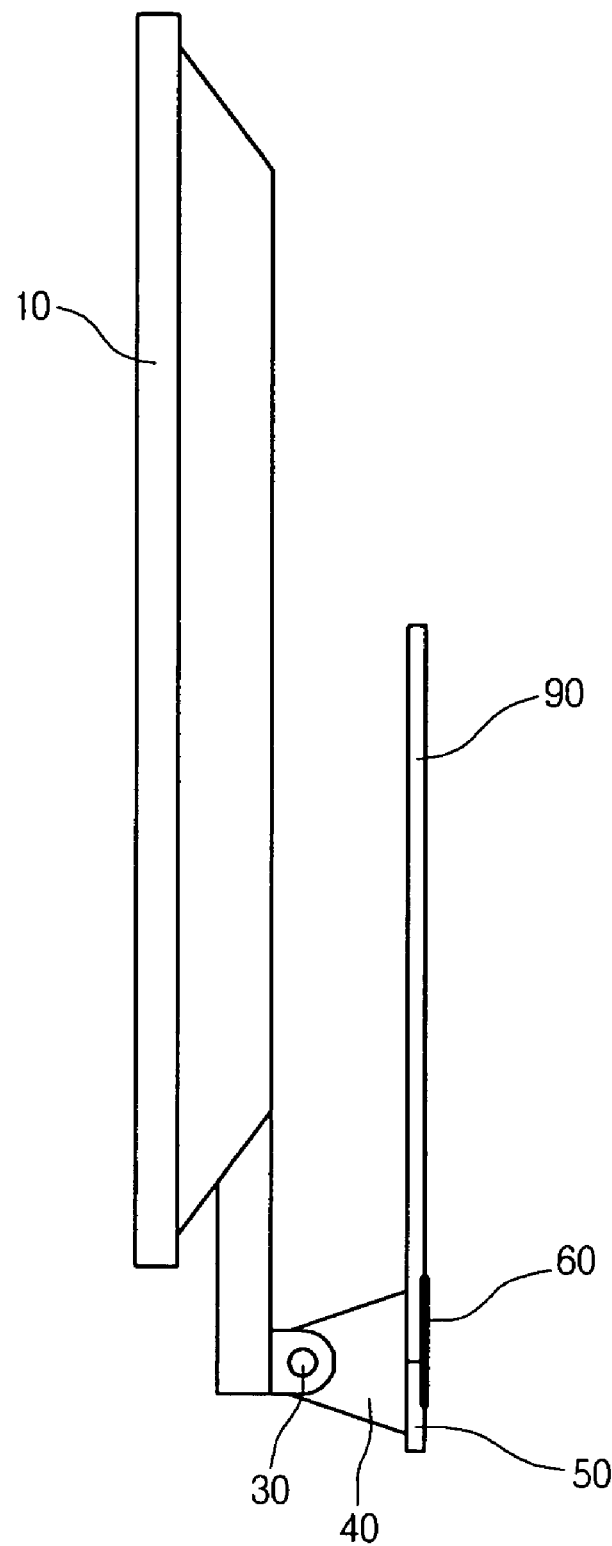
FIGS. 6 through 9 illustrate the process of expanding the stand.

Next, the folding of the stand will be described below. FIGS. 6 through 9 illustrate a process of expanding the folded stand. FIG. 6 illustrates the case where the respective components of the stand are completely folded, such that the product volume is most reduced. At this point, the pivot block 40 is folded to the rearward of the display device 10 by the first hinge 30, and the front base 90 is completely folded to the rearward of the display device 10 by the second hinge 60.

Figure 7:
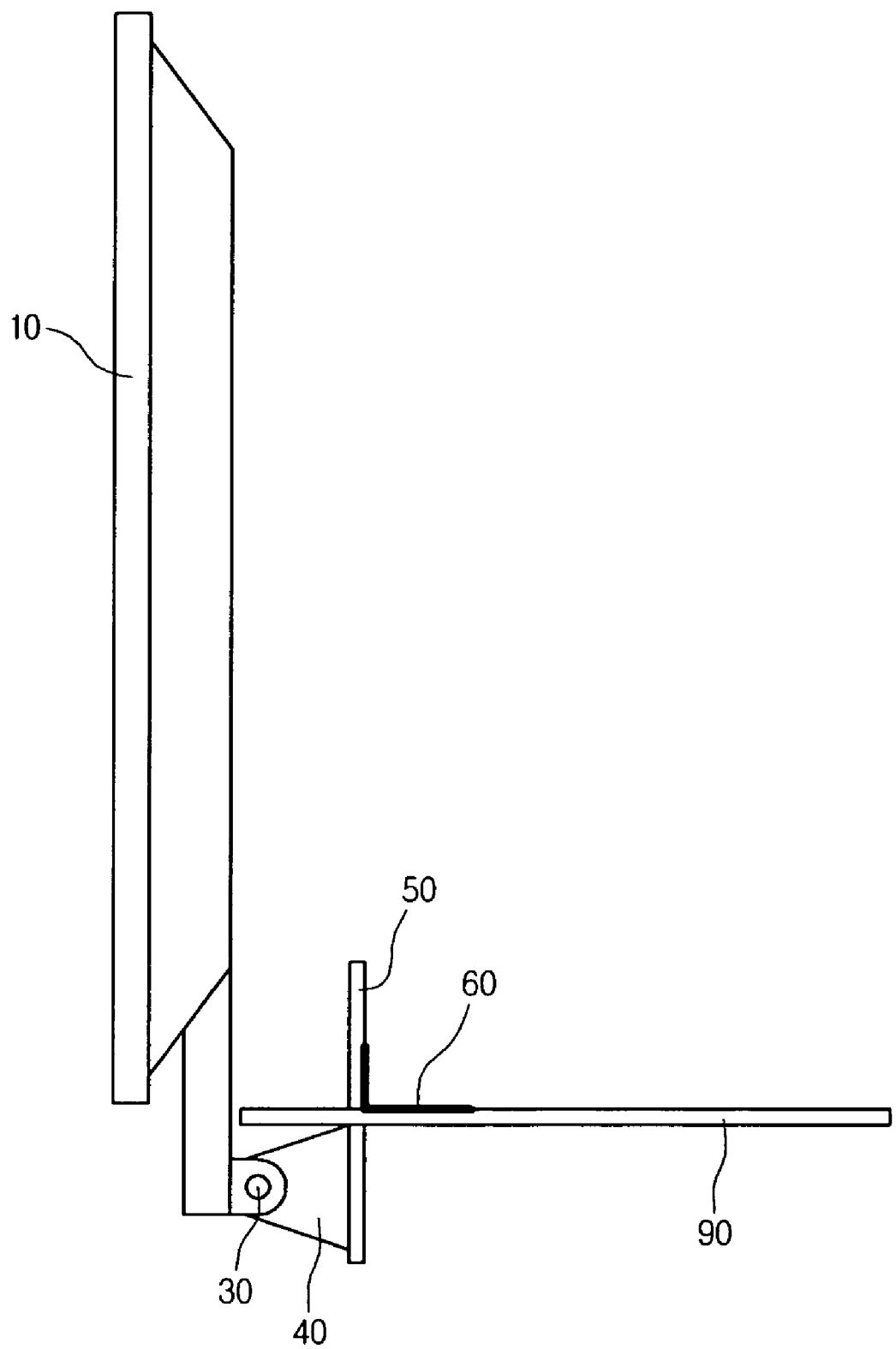
Figure 8:
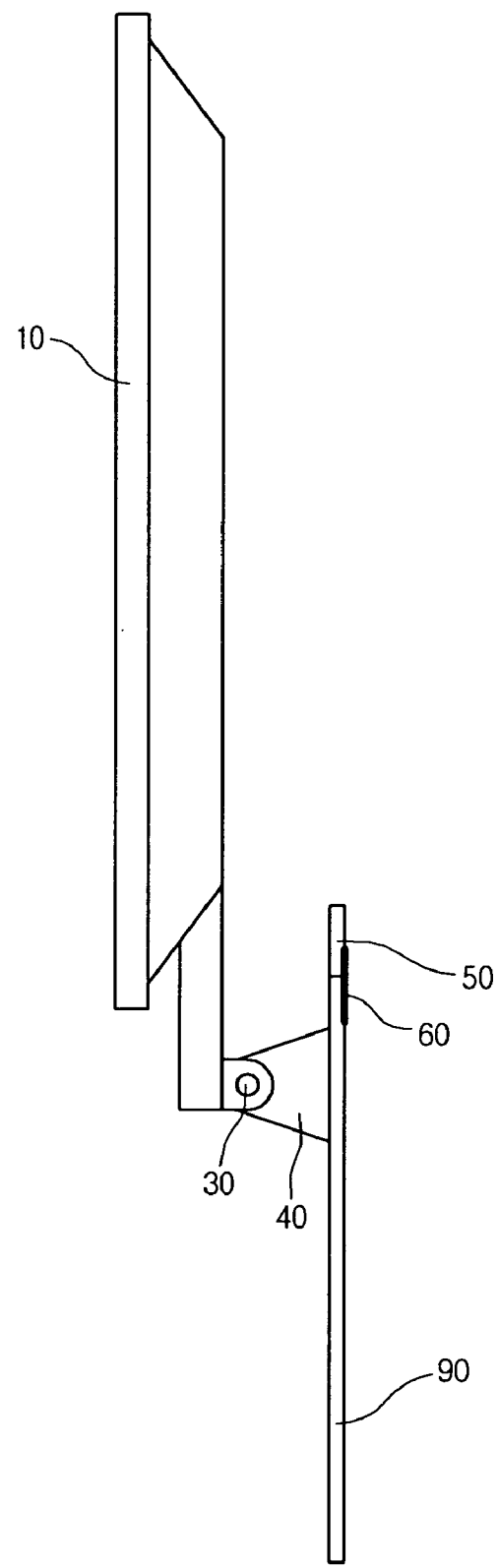
Figure 9:
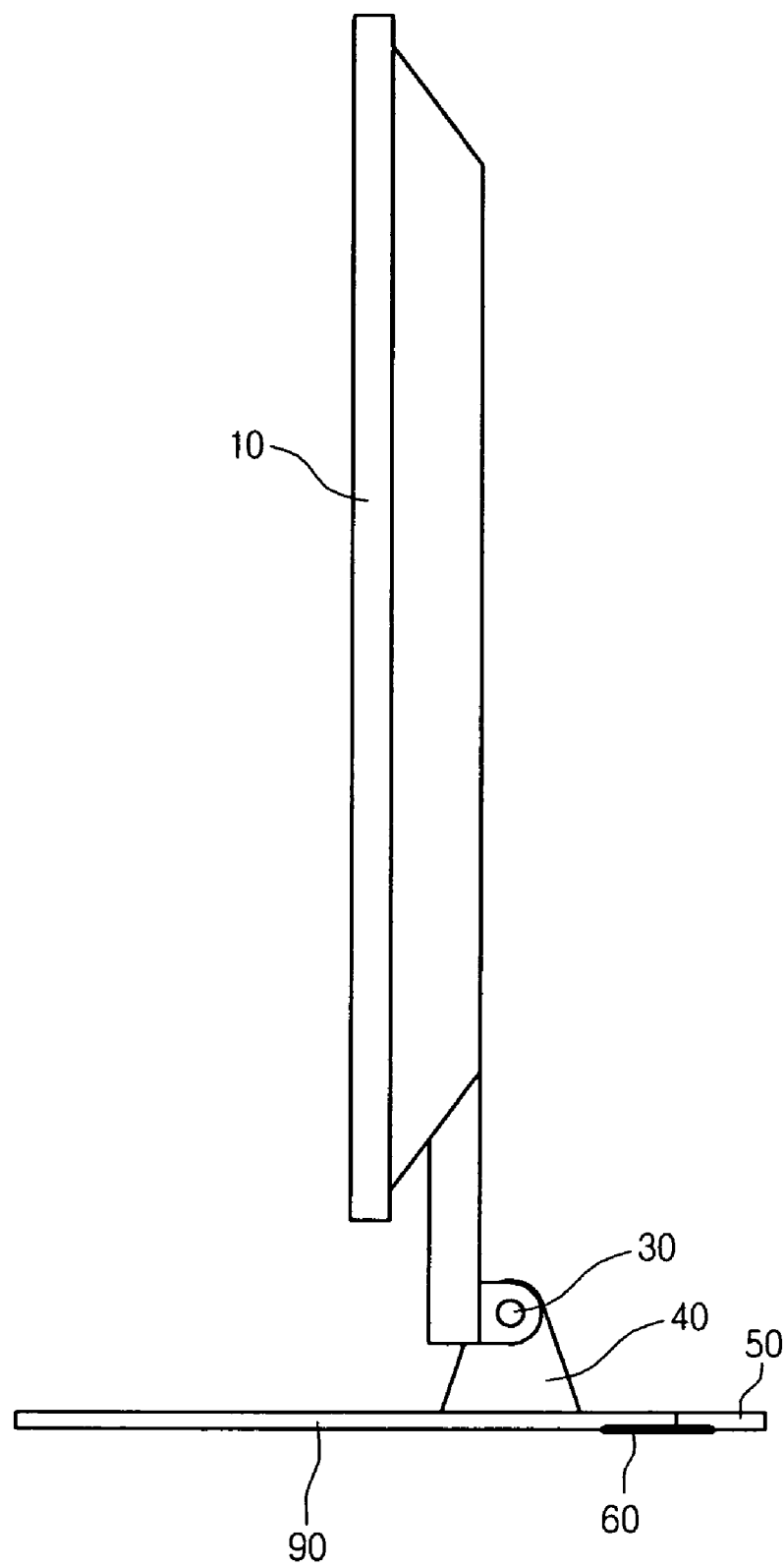

When the user unfolds the stand while taking the front base 90, since the friction force of the first hinge 30 is greater than that of the second hinge 60, the rear base 50 is maintained at the current state and the front base 90 is unfolded forward with respect to the rear base 60. FIG. 7 illustrates the case where the front base 90 is unfolded at 90°, and FIG. 8 illustrates the case where the front base 90 is completely unfolded. FIG. 9 illustrates the case where the front base 90 is completely unfolded and aligned with the rear base 50. The front base 90 is not unfolded because it is caught by the locking protrusion 63 of the second hinge 60.

If the front base 90 is further unfolded in this state, the pivot block 40 is unfolded around the first hinge 30 while the support 20 is fixed. After the pivot block 40 is completely unfolded, the front base 90 and the rear base 50 are unfolded such that they contact the floor. Consequently, the stand is placed on the floor as illustrated in FIG. 9.

Figure 10:
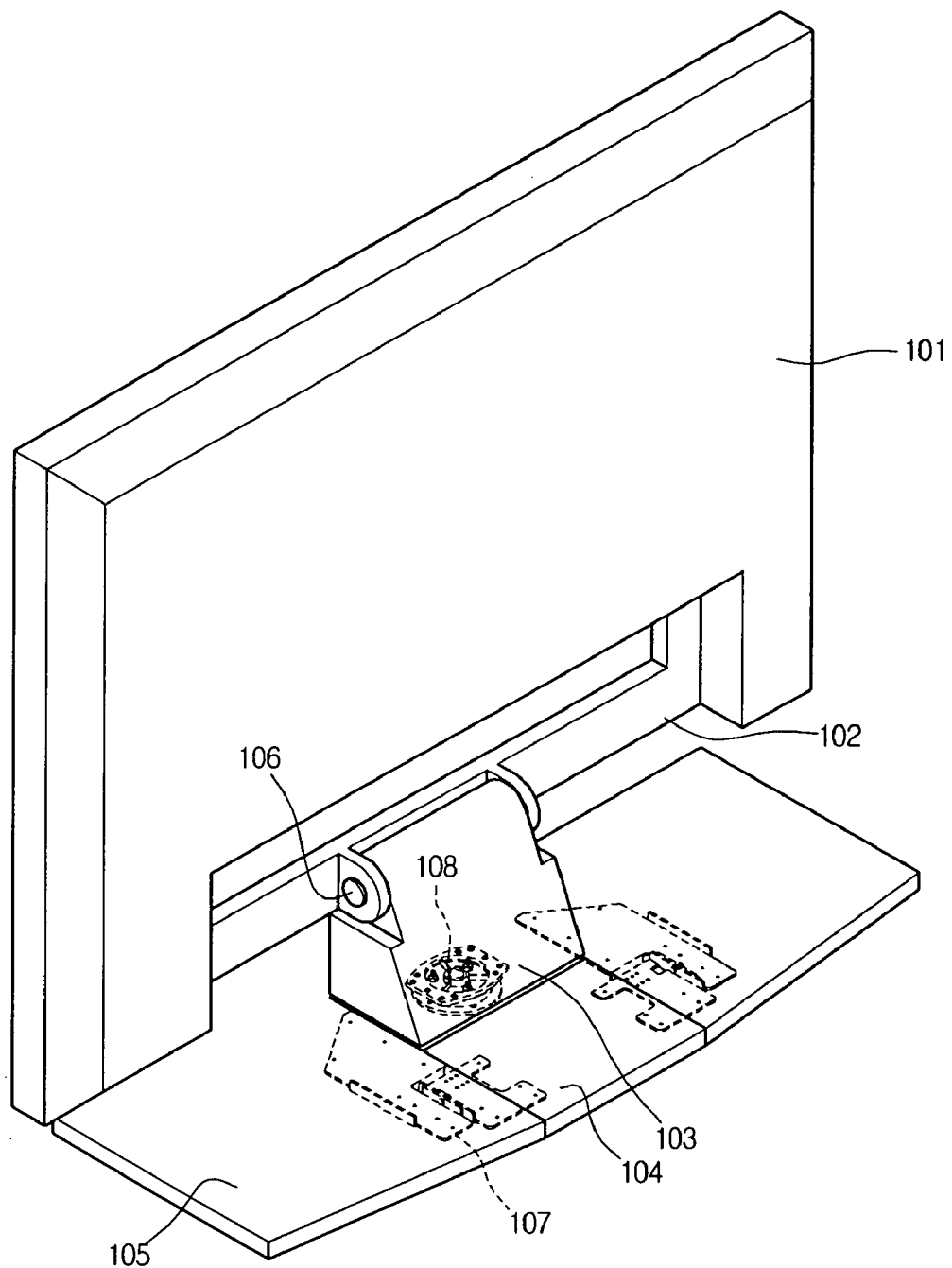
FIG. 10 is a perspective view of a stand according to another embodiment of the present invention.

FIG. 10 is a rear perspective view of a display device and a stand according to another embodiment of the present invention.

Referring to FIG. 10, the display device and the stand therefor are similar to the above-described display device and stand, except the pivot block 103 and the rear base 104. Therefore, the duplicated description will be omitted for conciseness.

Figure 11:
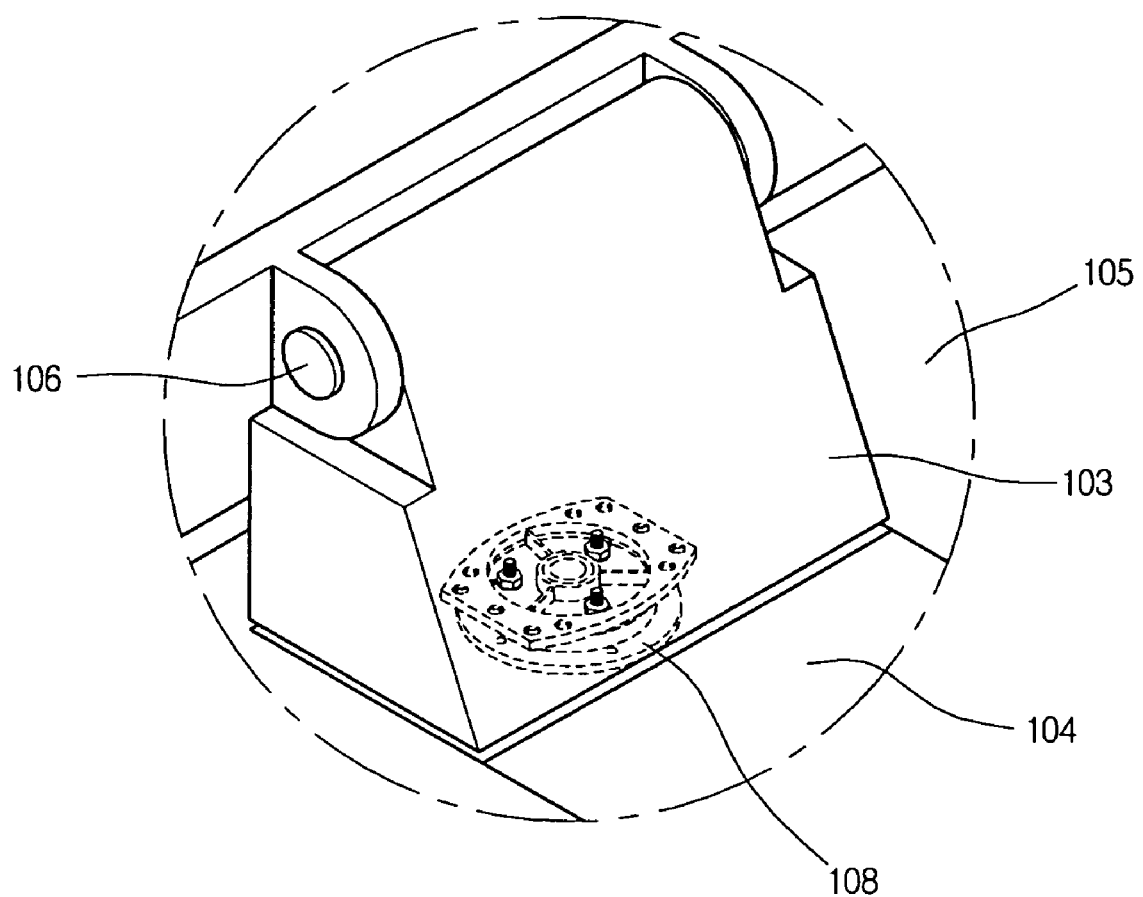
FIG. 11 is an enlarged perspective view of a pivot block of the stand.

A swivel 70 is placed at the contact portion between the pivot block 103 and the rear base 104. An upper portion of the swivel 70 is connected to the pivot block 103 and a lower portion of the swivel 70 is connected to the rear base 104. In this state, the lower portion of the pivot block 103 is placed at a position higher than the top surface of the front base 105. Therefore, even when the display device 101, the support 102 and the pivot block 103 are rotated, the front base 105 is not interfered from the pivot motion of the pivot block 103. Such a structure will be understood more fully with reference to FIG. 11.

Figure 12:
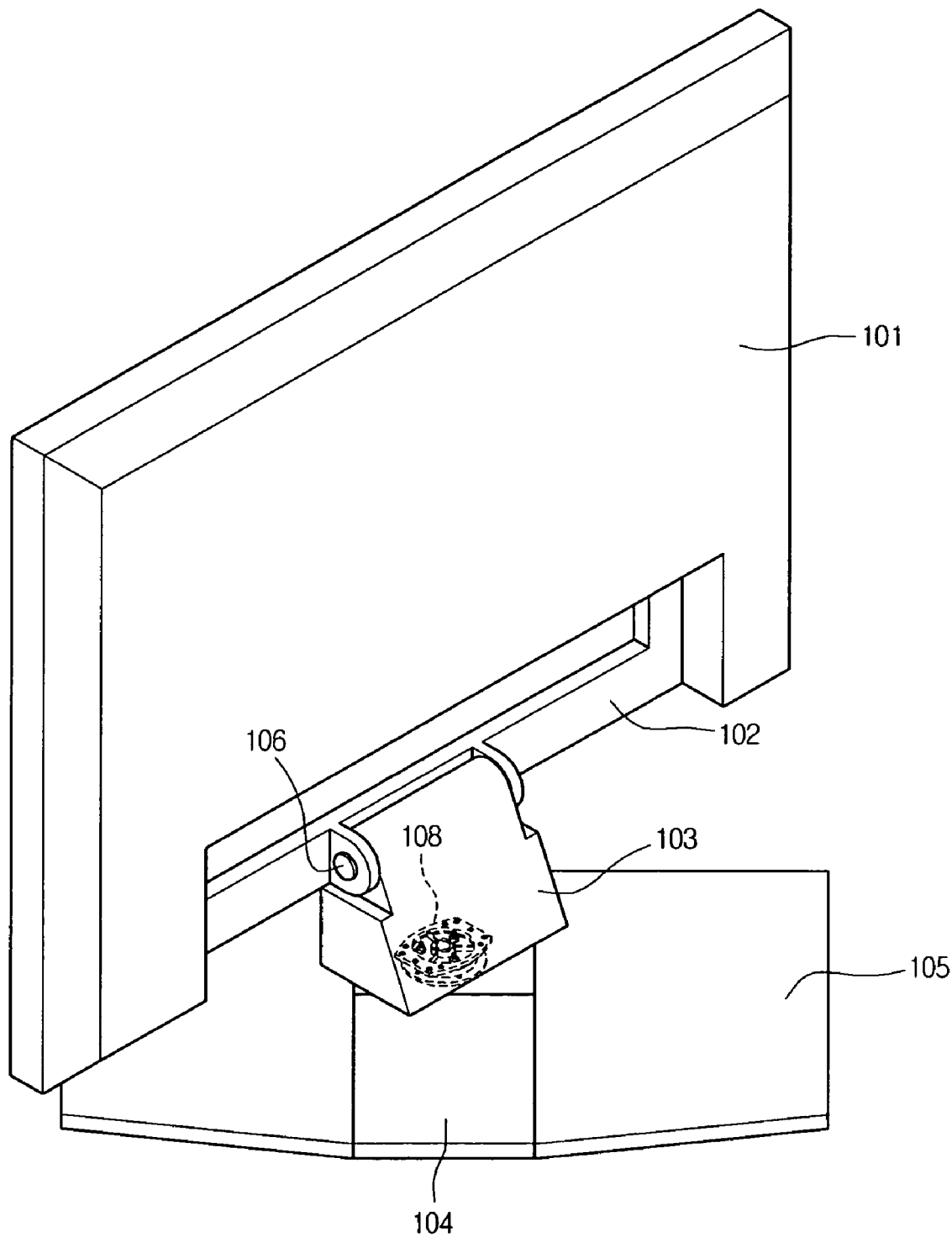

FIGS. 12 and 13 illustrate the case where the display device 11 is pivotally rotated by the pivot block 103.

In this embodiment, the pivot block 103 need not be large in size. Thus, the manufacturing cost of the pivot block 103, which has been formed of expensive metal, can be reduced. Also, only the front base 105 is observed from the front of the display device 101, and the rear base 104 is extended only toward the rear of the pivot block 103, thereby providing an elegant appearance. Specifically, the pivot block 103 has a rectangular shape, which one edge is provided at the front. The lower section also has a polygonal shape. When observed from the front, it looks as if there is nothing at the rear side. Therefore, the outer appearance looks elegant.

When the rear base 104 is folded so as to package the display device 101, the end portion of the front base 105 further extending downward from the lower portion of the display device 101 becomes short, thereby further reducing the volume of the package.

In a further embodiment of the present invention, the swivel can be provided with a pivot shaft and a fixing part for supporting the pivot shaft, instead of two divided parts of the upper rotation plate and the fixing plate. Also, the swivel can have various shapes. In this regard, the swivel can be constructed in any shapes only if they include the pivot part (e.g., the upper rotation plate) pivotally rotating together with the pivot block and the fixing part (e.g., the fixing plate) fixed to the pivot part.

In a further embodiment of the present invention, when the swivel is inevitably provided, any types of parts can be interposed which allow the relative motion between the front base and the rear base and allow the relative motion between the support and the pivot block. In this manner, in packaging and delivering the display device, the respective parts of the base structure can be folded or overlapped so that the volume is reduced, thereby promoting the user's convenience. In a further embodiment of the present invention, when only one of the connector of the front base and the rear base or the connector of the support and the pivot block is relatively operable, the package volume of the display device can be reduced.

According to the stand of the present invention, the package volume of the display device is reduced. Thus, the package cost and logistics cost of the display device can be reduced, and the delivery and treatment of the packaged display device becomes convenient.

Further, the angle between the viewer and the display device can be conveniently adjusted, and the base of the stand is provided in a folded shape, thereby improving the viewer's convenience.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand for a display, the stand comprising:
   a support configured to be connected to a lower portion of the display;
   a pivot block operably coupled to the support;
   a rear base connected to the pivot block;
   a swivel disposed in a contact portion between the pivot block and the rear base such that the pivot block pivotally rotates with respect to the rear base;
   a front base operably coupled to the rear base
   a first hinge disposed in a connecting portion of the support and the pivot block, wherein the first hinge rotatably couples the support and the pivot block; and
   a second hinge disposed in a connecting portion of the rear base and the front base, wherein the second hinge rotatably couples the rear base and the front base, wherein, in a first mode the front and rear bases are rotated about the pivot block so as to be substantially coplanar and oriented parallel to a support surface on which the front and rear bases are configured to be positioned so as to provide for viewing of the display.

2. The stand according to claim 1, wherein at least one of the first hinge or the second hinge includes a hinge shaft that extends in a horizontal direction of the display.

3. The stand according to claim 1, wherein a friction force of the first hinge is greater than that of the second hinge.

4. The stand according to claim 1, wherein the pivot block includes a circular planar portion, and a protrusion portion that protrudes upward from the planar portion so as to be connected to the support.

5. The stand according to claim 4, wherein the planar portion is seated on the rear base.

6. The stand according to claim 1, wherein a lower portion of the pivot block is positioned higher than a top of the front base so as to prevent interference between the pivot block and the front base during rotation of the pivot block.

7. The stand according to claim 1, wherein the rear base is formed only toward a rear of the pivot block.

8. The stand according to claim 1, wherein a lower portion of the pivot block has a polygonal shape.

9. The stand according to claim 8, wherein the pivot block has a rectangular horizontal section, one edge being directed toward a front of the pivot block.

10. A stand for a display device, comprising:
    a support configured to support a display device;
    a pivot block movably connected to the support;
    a swivel having at least a fixing portion and a pivot portion that pivots with respect to the fixing portion, the pivot portion being connected to the pivot block;
    a first hinge disposed in a connecting portion of the support and the pivot block, allowing the pivot block to rotate rearward with respect to the support;
    a first base connected to the fixing portion of the swivel and having a lower surface configured to be positioned on a support surface; and
    a second base movably coupled to the first base and having a lower surface configured to be positioned on the support surface, wherein, in a first mode the first and second bases are configured to be positioned adjacent to each other on the support surface so as to provide for viewing of the display device.

11. The stand according to claim 10, further comprising a second hinge disposed in a connecting portion of the first base and the second base, allowing the second base to rotate rearward with respect to the first base.

12. The stand according to claim 10, wherein the first base is configured to support a front of the display device and the second base is configured to support a rear of the display device.

13. The stand according to claim 1, wherein, in a second mode, the front and rear bases are substantially coplanar and are rotated about the pivot block so as to be oriented substantially parallel to the display configured to be connected to the support.

14. The stand according to claim 13, wherein the second mode is a shipping mode in which the front and rear bases are positioned parallel to a rear surface of the display and separated by the pivot block.

15. The stand according to claim 10, wherein, in a second mode, the first and second bases are configured to be positioned adjacent to each other so as to be substantially coplanar and substantially parallel to the display configured to be connected to the support.

* * * * *